United States Patent
Duan et al.

(10) Patent No.: US 9,772,932 B2
(45) Date of Patent: Sep. 26, 2017

(54) APPLICATION TEST ACROSS PLATFORMS

(71) Applicant: INTERNATIONAL BUSINESS MACHINES CORPORATION, Armonk, NY (US)

(72) Inventors: Ning Duan, Beijing (CN); Zhi Lin Hu, Ningbo (CN); Zhi Hu Wang, Beijing (CN); Yong Zheng, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/811,956

(22) Filed: Jul. 29, 2015

(65) Prior Publication Data

US 2016/0034383 A1 Feb. 4, 2016

(30) Foreign Application Priority Data

Jul. 30, 2014 (CN) .......................... 2014 1 0371067

(51) Int. Cl.
*G06F 9/44* (2006.01)
*G06F 9/45* (2006.01)
*G06F 11/36* (2006.01)

(52) U.S. Cl.
CPC ...... *G06F 11/3688* (2013.01); *G06F 11/3664* (2013.01); *G06F 11/3672* (2013.01); *G06F 11/3692* (2013.01)

(58) Field of Classification Search
CPC ......... G06F 11/3688; G06F 11/3664–11/3696; G06F 11/3692; G06F 11/3672
See application file for complete search history.

(56) References Cited

U.S. PATENT DOCUMENTS 8,141,043 B2 * 3/2012 Jones .................... G06F 9/547
714/38.1
8,620,305 B2  12/2013 Hamlin et al.
(Continued)

FOREIGN PATENT DOCUMENTS

WO  2012049376 A1  4/2012

OTHER PUBLICATIONS

Youssef Bassil, Distributed, Cross-Platform, and Regression Testing Architecture for Service-Oriented Architecture, 2012, pp. 1-8.*
(Continued)

*Primary Examiner* — Thuy Dao
*Assistant Examiner* — Mongbao Nguyen
(74) *Attorney, Agent, or Firm* — David Quinn

(57) ABSTRACT

A method and a system for testing an application across platforms. Application testing for checking functionality of an application is carried out to insure that same applications have the same behavior on different platforms. Such platforms include function, user interface (UI), and generated data. One embodiment of the present invention provides a method for cross-platform application testing. A first response to an action is determined on a first platform. The action is triggered on a second platform, the second platform being different from the first platform. Then, a second response is determined to the action on the second platform. Finally, the first response and the second response are compared to test consistency of the application on the first platform and the second platform. A corresponding system for testing an application across platforms is also provided.

13 Claims, 2 Drawing Sheets

(56) References Cited

U.S. PATENT DOCUMENTS

| | | | |
|---|---|---|---|
| 8,719,776 B2 | 5/2014 | Carosi et al. | |
| 8,819,638 B2* | 8/2014 | Sharma | G06F 11/3688 714/37 |
| 8,856,748 B1* | 10/2014 | Larsen | G06F 11/3668 717/125 |
| 8,875,102 B1* | 10/2014 | Feng | G06F 11/3664 717/124 |
| 9,189,378 B1* | 11/2015 | Ryan | G06F 11/3664 |
| 2006/0080638 A1* | 4/2006 | Fiore | G06F 8/71 717/104 |
| 2007/0022324 A1* | 1/2007 | Chang | G06F 11/3672 714/38.14 |
| 2008/0244524 A1* | 10/2008 | Kelso | G06F 11/3664 717/124 |
| 2008/0244525 A1* | 10/2008 | Khalil | G06F 11/3688 717/124 |
| 2009/0019315 A1* | 1/2009 | Belvin | G06F 11/3688 714/38.14 |
| 2011/0131450 A1* | 6/2011 | Wheeler | G06F 11/3688 714/32 |
| 2011/0276946 A1* | 11/2011 | Pletter | G06F 11/3688 717/124 |
| 2012/0192153 A1* | 7/2012 | Venkatraman | G06F 11/3672 717/124 |
| 2012/0246619 A1* | 9/2012 | Thirumalai | G06F 11/3664 717/124 |
| 2013/0014084 A1* | 1/2013 | Sahibzada | G06F 11/368 717/124 |
| 2013/0080999 A1* | 3/2013 | Yang | G06F 11/3664 717/124 |
| 2013/0111445 A1* | 5/2013 | Jones | G06F 11/3672 717/124 |
| 2013/0139129 A1 | 5/2013 | Hsieh et al. | |
| 2013/0179865 A1* | 7/2013 | Neumeyer | G06F 11/368 717/127 |
| 2013/0246849 A1* | 9/2013 | Plamondon | G06F 11/3688 714/27 |
| 2014/0047417 A1* | 2/2014 | Kaasila | G06F 11/3664 717/135 |
| 2014/0095931 A1* | 4/2014 | Sadasivam | G06F 11/3664 714/28 |
| 2014/0095933 A1 | 4/2014 | Behrens et al. | |
| 2014/0123114 A1* | 5/2014 | Navalur | G06F 11/3688 717/127 |
| 2014/0157238 A1* | 6/2014 | Popov | G06F 11/3672 717/126 |
| 2014/0298297 A1* | 10/2014 | Prasad | G06F 11/3684 717/125 |
| 2014/0331209 A1* | 11/2014 | Singh | G06F 11/3688 717/127 |
| 2014/0380278 A1* | 12/2014 | Dayan | G06F 11/3688 717/124 |
| 2015/0026665 A1* | 1/2015 | Chen | G06F 11/3696 717/124 |
| 2015/0067656 A1* | 3/2015 | Knych | H04W 4/00 717/135 |
| 2015/0205709 A1* | 7/2015 | Michelsen | G06F 11/323 714/38.1 |
| 2015/0227449 A1* | 8/2015 | Kuang | G06F 8/71 717/121 |
| 2015/0278076 A1* | 10/2015 | Bs | G06F 11/3664 714/38.1 |
| 2016/0077955 A1* | 3/2016 | Werghis | G06F 11/3688 715/762 |

OTHER PUBLICATIONS

Yepeng Yao, A Distributed, Cross-Platform Automation Testing Framework for GUI-Driven Applications, 2012, pp. 1-4.*

Renu Kela, Application of Server Virtualization in Platform Testing, 2007, pp. 1-11.*

Shuvra S. Bhattacharyya, Teaching Cross-Platform design and Testing Methods for Embedded Systems using DICE, 2011, pp. 1-8.*

Andreas Holzinger, Making Apps Useable on Multiple Different Mobile Platforms: On Interoperability for Business Application Development on Smartphones, 2012, pp. 1-14.*

Jean Hartmann, Exploring Cross-Platform Testing Strategies at Microsoft, 2011, pp. 1-9.*

Esposito, Patrizio et al., Software Testing of Mobile Applications: Challenges and Future Research Directions, 2012.

Hartmann Jean, Exploring Cross-Platform Testing Strategies at Microsoft, 2011.

Starov, Oleksii et al., Integrated TaaS Platform for Mobile Development: Architecture Solutions, 2013.

* cited by examiner

APPLICATION TEST ACROSS PLATFORMS

CROSS-REFERENCE TO RELATED APPLICATION

This application claims the benefit of priority from Chinese Patent Application No. 201410371067.6, filed Jul. 30, 2014, the contents of which are incorporated herein by reference.

TECHNICAL FIELD

The present invention relates to a method and system for application testing across platforms.

BACKGROUND

Application testing is an important means for checking functionality of an application. At present, mobile devices such as a mobile phone and a tablet computer have become more prevalent than before. Correspondingly, many application providers are developing mass applications for mobile devices. In the context of the present invention, applications running on mobile devices are called "mobile applications".

Mobile devices manufactured by different manufacturers can run on different platforms. Moreover, the same platforms can also have a plurality of different versions. Compared with the traditional desktop computer, the platforms of mobile devices develop more rapidly. The above features of the mobile device bring challenges to testing for mobile applications.

In testing for mobile applications, besides the testing of the function per se, consistency of an application on different platforms should also be tested. The same application should have the same behaviors on different platforms, including function, user interface (UI), and generated data. Conventionally, a tester needs to operate the application manually on different platforms based on a predetermined testing process, and collect corresponding testing data. Afterwards, the tester needs to compare testing data for different platforms, thereby accomplishing the testing on cross-platform consistency. The above testing process requires the tester to repeat the testing operations for different platforms, which is time-consuming and inflexible. Additionally, in some cases, a testing process purely based on judgment of a human user is error-prone. Cross-platform testing is also necessary for many applications on traditional desktop computers as these problems do not only exist in mobile application testing.

SUMMARY

Embodiments of the present invention provide a technical solution for cross-platform application testing.

In one aspect, embodiments of the present invention provide a method for cross-platform application testing. A first response to an action is determined on a first platform. The action is triggered on a second platform, the second platform being different from the first platform. Then, a second response is determined to the action on the second platform. Next, the first response and the second response are compared to test consistency of the application on the first platform and the second platform.

In another aspect, embodiments of the present invention provide a computer implemented system for cross-platform application testing. A first response determining unit is configured to determine a first response of the application to an action on a first platform. An action triggering unit is configured to automatically trigger the action for application on a second platform by identifying the action, the second platform being different from the first platform. Then, a second response determining unit is configured to determine a second response of the application to the action on the second platform. Next, a comparison unit is configured to compare the first response and the second response to test consistency of the application on the first platform and the second platform.

According to embodiments of the present invention, the application testing across platforms can be implemented in real-time under master-slave architecture. The master platform can transmit in real-time the actions and application responses of the tested application on the master platform to the server. Then, the server triggers a corresponding action for the tested application on a slave platform. The server can parse and compare the application responses on the master platform and the slave platform, thereby determining the cross-platform consistency of the application. Other features and advantages of the present invention will become easily comprehensible through the description below.

BRIEF DESCRIPTION OF THE SEVERAL VIEWS OF THE DRAWINGS

Features and advantages of the present invention will become apparent, through description of embodiments of the present invention.

In the accompanying drawings, the same or similar reference numerals are used to indicate the same or similar elements.

DETAILED DESCRIPTION

Preferred embodiments will be described in detail with reference to the accompanying drawings, in which the preferable embodiments of the present invention have been illustrated. The present invention can be implemented in various manners, and thus should not be construed to be limited to the embodiments illustrated herein.

Figure 1:
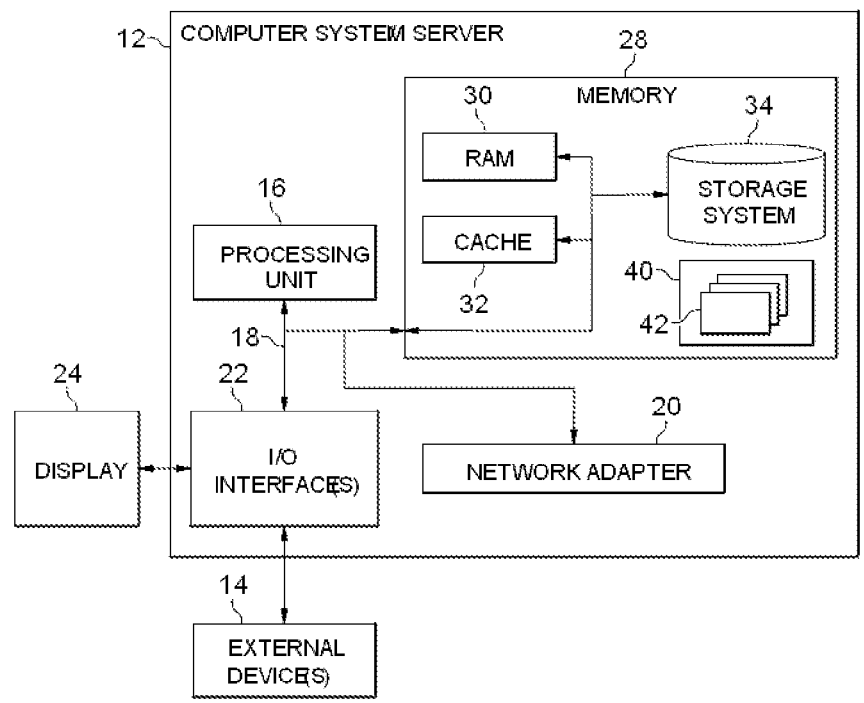
FIG. 1 shows an exemplary computer system which is applicable to implement embodiments of the present invention.

As shown in FIG. 1, in which an exemplary general-purpose computer system/server 12 applicable to implement embodiments of the present invention is illustrated. Computer system/server 12 is only illustrative and is not intended to suggest any limitation as to the scope of use or functionality of embodiments of the invention described herein. The components of computer system/server 12 can include, at least one processor or processing unit 16, a system memory 28, and a bus 18 that couples various system components including system memory 28 to processor 16.

Bus 18 represents at least one of the several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 can include a variety of computer system readable media. Such readable media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. Storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. Memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program module, and program data. Each of the operating systems, at least one application program, other program module, and program data or some combination thereof, can include an implementation of a networking environment. Program modules 42 generally carry out the functions and/or methodologies of embodiments of the invention as described herein.

Computer system/server 12 can communicate with at least one external devices 14 such as a keyboard, a pointing device, a display 24, etc.; with at least one device that enables a user to interact with computer system/server 12; and/or any devices (e.g., network card, modem, etc.) that enable computer system/server 12 to communicate with at least one other computing devices. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. Network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to" The term "plural" or a similar expression indicates "two or more." The term "one embodiment" indicates "at least one embodiment." The term "another embodiment" indicates "at least another one embodiment." Definitions of other terms will be provided in the description infra. The term "platform" here refers to a software and/or hardware system on which an application can run. Examples of the platform include, but not limited to, an operating system (OS), a virtual machine, etc. As an example, different platforms can refer to different operating systems or different versions of the same operating system. Different platforms can run on different physical machines. Alternatively, different platforms can also run on the same physical machines.

According to embodiments of the present invention, the platforms on which a tested application runs are divided into a master platform and a slave platform. It should be understood that the master platform and the slave platform are termed relatively. For two platforms, either thereof can be selected as the master platform, while the other acts as the slave platform. Only for the convenience of discussion, in the description infra, the master platform is called "a first platform," while the slave platform is called "a second platform".

Figure 2:
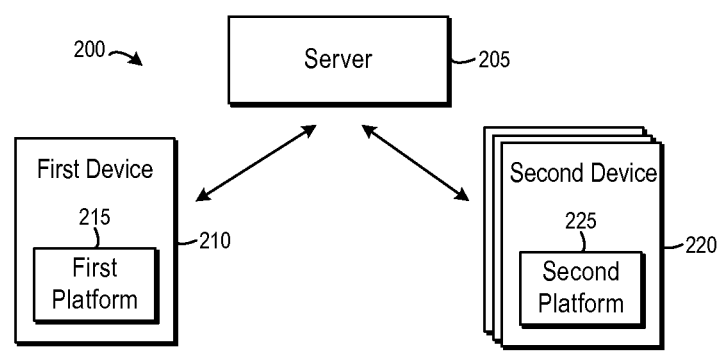
FIG. 2 shows a schematic flow diagram of a system for testing an application across platforms in which embodiments of the present invention can be implemented.

FIG. 2 shows a schematic block diagram of an environment 200 in which embodiments of the present invention can be implemented. In the environment 200 shown in FIG. 2, the server 205 is in charge of executing the application testing across platforms. The server 205 can be implemented by the server 12 as described with reference to FIG. 1. The server 205 can communicate with a first device 210 and at least one second device 220. The communication between the server and the device can depend on any appropriate medium, including a computer network, e.g., Internet, wires or wireless local area network; a communication network; near-field communication network, e.g., infrared, and Bluetooth.

On the first device 210 runs a first platform 215, and on the second device 220 runs a second platform 225. During testing, on the first platform 215 and the second platform 225 runs the same application. The objective of testing is to check whether the user interface and function of the application are consistent on the first platform 215 and the second platform 225.

In one embodiment, the first platform 215 and/or the second platform 225 can be a platform for a mobile device. Such an embodiment can be used for cross-platform testing for a mobile application. Embodiments of the present invention are likewise applicable for applications designed and developed for a fixed-type electronic device. For example, in one embodiment, the first platform 215 and/or the second platform 225 can be a platform for a desktop computer. In this case, the first platform 215 and the second platform 225 can run on the same physical machine. In other words, the first device 210 and the second device 220 can be the same physical device.

Figure 3:
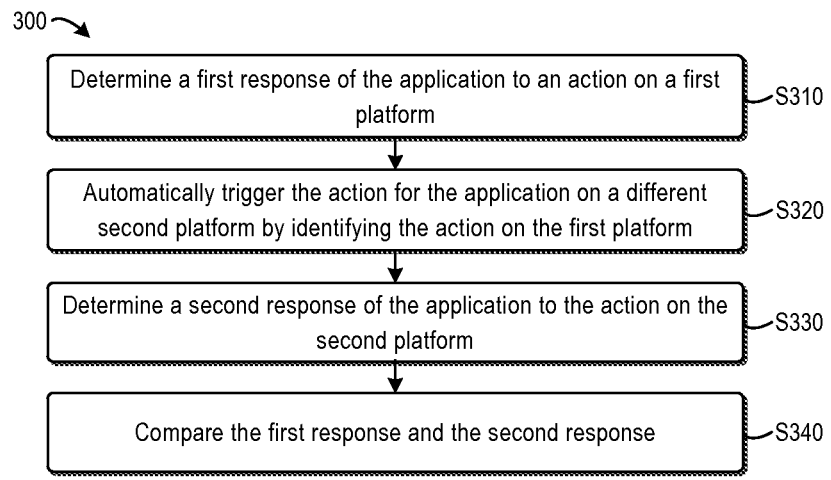
FIG. 3 shows a schematic flow diagram of a computer-implemented method for testing an application across platforms according to embodiments of the present invention.

FIG. 3 shows a flow diagram of a computer-implemented method 300 for testing an application across platforms according to embodiments of the present invention. The method 300 is executed by a server 205 for testing in FIG. 2. The method 300 starts from step S310, where a response from an application under test on a first platform to one action is determined. For the convenience of discussion, the response is called a "first response".

According to embodiments of the present invention, during the testing process, an application on the first platform can be operated based on a predefined testing flow. The action for the application on the first platform can be performed manually by a user. Alternatively, the application can be operated automatically on the first platform through a testing tool or a simulation tool. Examples of actions include, but not limited to, at least one of the following:

initiating an application, various operations on the application, and exiting an application.

In one embodiment, determining a first response can include determining a layout of a view displayed for the application in response to the action on the first platform. For the convenience of discussion, the view of the application on the first platform is called a "first view," and the layout of the first view on the first platform is called a "first layout."

The term "view" used here refers to presentation or display of the user interface of an application. The term "layout" used here refers to elements included on the view, sizes of the elements, and arrangement on the view, etc. The term "element" used here refers to a component of the user interface, including, but not limited to, a control, icon, displayed text, image, multimedia, and the comparable on the user interface.

On the first platform, the application can present a first view in response to an action. For example, in response to initiation of an operation, an initial view (e.g., a welcome view) of the application will be displayed on the first platform. For another example, if a "user logon" operation of the application is selected, the application can present a logon view to the user.

A first view can include different elements. As an example, the logon view can include textual input boxes for entering a username and a password. The logon view can also include a control for submitting a logon request, e.g., a "logon" button. Alternatively, the logon view can also include other controls, e.g., a "forget the password" button, etc.

In order to determine a first layout of a first view of an application on a first platform, in one embodiment, a first device can obtain a screen shot of the first view. The screen shot is an image of the first view on the first platform. The screen shot of the first view on the first platform can be sent to a server by the first device. Correspondingly, the server can apply an image processing to the screen shot to resolve the first layout of the first view on the first platform.

Specifically, in one embodiment, the screen shot can be subject to a boundary extraction algorithm to extract the boundary information in the image. Any currently known or future developed boundary extraction algorithm can be used in conjunction with embodiments of the present invention. Boundary operators can be applied to the screen shot of the first view. Examples of the boundary operators include, but not limited to, at least one of the following: a Sobel operator, a Canny operator, and a Roberts operator.

In one embodiment, after the boundary extraction processing is applied, a pattern and/or edge connection processing can be applied to the screen shot of the first view. Then, elements in the first view can be identified based on the boundary information. For example, in one embodiment, each closed area formed by boundaries is identified as an element.

Alternatively, in one embodiment, character recognition processing such as optical character recognition ("OCR") can be applied to the screen shot to extract the characters in the screen shot. In this embodiment, an area including characters in the screen shot can be regarded as an element in the first view.

After an element in the view is extracted, at least one property of the element can be identified. In one embodiment, literal contents associated with the element can be identified. For example, literal contents on a button, a menu, or any other appropriate control can be recognized. As mentioned above, a technology such as OCR can be utilized to perform recognition of the literal contents. In one embodiment, the recognized literal contents can be used as tags of the elements. For example, the words on the buttons (e.g., "submit," "return") can act as the tags for the buttons.

In one embodiment, a position of an element in the first view can be identified. For example, a position of an element in the first view can be represented by coordinates of a specific point, e.g., left upper corner. An absolute position of the element in the first view can be used. Alternatively, a relative position of the element in the first view can also be used. For example, in one embodiment, a relative distance from the element to at least one boundary of the first view can be determined.

In one embodiment, a size of an element can be determined. For example, a rectangular bounding box of the element can be calculated, using the size of the bounding box as the size of the element. Similar to the position, the size of the element can be an absolute size. Alternatively, the size of the element can also be a relative size about the first view, e.g., proportion to a length and/or width of the first view.

The examples described above are only exemplary. Any appropriate attribute of an element can be used in conjunction with embodiments of the present invention. For example, in one embodiment, the shape, color, or the like of at least one element in the first view can be recognized.

In addition to the image processing technology or as a supplementation, in one embodiment, metadata about the first view can be used to recognize element attributes. The metadata can describe the attributes of respective elements in the first view, e.g., size, color, position, literal content, etc. If the application under text is a web-based application, the view of the application can be a web page. In this case, the metadata of the first view can include at least one of the following associated with the web pages: script, program, cascading style sheet (CSS), and source code. The first device can send the metadata about the first view to the server, such that the server determines the first layout of the first view based on the metadata. A hypertext markup language (HTML) can indicate the attributes such as position, size, and color of an element in the web page using the attributes of the tag. In this case, the server can determine these attributes of a corresponding element by resolving the HTML tag and its attributes.

The image processing technology and the metadata can be used separately or in combination. For example, in one embodiment, the positions of at least one element can be first determined based on the metadata, and then an image recognition technology (e.g., OCR) can be applied at a corresponding position to extract the attributes of the element.

The first layout can be stored using any appropriate data structure. For example, in one embodiment, the first layout can be stored using the following table structure:

TABLE 1

| identification | Tag (literal content) | Type | Position | Size |
|---|---|---|---|---|
| 1 | "Caption" | Caption column | (x1, y1) | Length: $L_1$, Width: $W_1$ |
| 2 | "Start" | Button | (x2, y2) | Length: $L_1$, Width: $W_1$ |
| ... | ... | ... | ... | ... |

For each layout of each view, the server can store such a table. In one embodiment, such a table can be implemented by virtue of a database. Alternatively, the layout can also be stored in various kinds of appropriate formats such as extensible markup language (XML) and textual file.

A first layout of the first view can be determined by the server. Alternatively, in one embodiment, the first layout of the first view can be determined at the first platform based on the screen shot and/or metadata of the first view. At this point, the first device can send the information descriptive of the first layout to the server, such that the server directly uses the data. For example, in one embodiment, a layout structure as described in table 1 can be generated at the first device, and sent to the server.

In addition to the layout of the view or as an alternative, in step S310, any other response of the application to the action can be determined. For example, in one embodiment, in response to a particular action, the application on the first platform can generate, process, and/or store data on the backstage. In this embodiment, the first device can send the generated, processed and/or stored data to the server. The data generated by the application in response to the action on the first platform are called "first data." In other words, in step S310, a first data generated on the first platform can be received from the first device. In particular, the first data can include backstage data not presented to the user.

In FIG. 3, in step S320, the server automatically triggers the same action for the application on a second platform through identifying the action occurring on the first platform. Identifying the action at least includes identifying a type of the action. The server identifies what kind of action is performed to the application on the first platform. As an example, suppose an "initiation" action is executed by the user on the first platform, the application on the first platform displays a welcome view of the first layout. In this case, in step S320, the server can instruct the second device to trigger the "initiation" action for the application under test on the second platform.

In particular, the action performed on the first platform can be associated with a particular foreground data. Examples of the foreground data include at least one of the following: input entered by the user, data presented by the application to the user, etc. These foreground data will affect subsequent behaviors of the application. For example, when the user clicks onto "logon" after entering the username and password in the logon view, correct username/password and wrong username/password will cause different next views. In order to accurately test the cross-platform consistency of the application under test, in one embodiment, identifying an action further includes obtaining foreground data associated with the action. To this end, the server can collect in real time the foreground data associated with the action from a first platform as the master platform. In the above described example, the server can receive the username and password entered by the user from the first device.

In certain cases, the action performed on the first platform is likely associated with a specific event. For example, some actions cam be associated with a touch gesture of the touch screen of the first device. The server can receive a description of an event associated with the action from the first device to identify event information associated with the action.

The first device can obtain foreground data and/or events associated with the action utilizing various appropriate means. In one embodiment, the first device can capture such data and/or events with an agent listener running in a debug mode. Other currently known or future developed technologies are likewise feasible.

Method 300 determines a response of the application under test to the triggered action on the second platform in step S330. For the convenience of discussion, the response is called "a second response." The second response can include a layout of a view displayed for the application under test in response to the triggered action on the second platform. For the convenience of discussion, the view displayed for the application on the second platform in response to the triggered action is called "a second view," and the layout of the second view is called "a second layout."

The first view and the second view can be identical or different. For example, when the function of the application across different platforms is consistent, the first view and the second view can be identical. Moreover, in the case that the first view and the second view are identical (e.g., logon success view), the layouts of the two can also be identical or different. Therefore, it is necessary to perform cross-platform testing.

Determination of the second layout is similar to determination of the first layout as described above with reference to step S310. For example, the second device can send a screen shot and/or metadata of the second layout to the server such that the server determines the elements included in the second view on the second platform and the attribute of the element. Alternatively, the second device can also locally determine the second layout, and send the information descriptive of the second layout to the server.

The second layout can be stored in a manner identical or similar to the first layout. For example, in one embodiment, the second layout can be indicated using Table 1 described above. It is also possible to represent the first layout and the second layout in different forms. In this case, the first layout and the second layout can be converted into a comparable format during the subsequent comparison process. Alternatively, the second response can include data (called "second data") generated, processed, and/or stored by the application under test on the second platform in response to the triggered action. For example, the second data can include the backstage data associated with the application under test on the second platform.

In subsequent step S340, the first response determined in step S310 and the second response determined in step S330 are compared. In one embodiment, in step S340, the layout of the first view of the application on the first platform can be compared with the second layout of the second view on the second platform. It is possible to compare the elements included in the first view and the second view and the attributes thereof. In an embodiment of representing the first layout and the second layout using table 1 as described above, the elements in the first view and the second view, as well as respective attributes of the elements, can be compared one by one. It can be determined whether the first view and the second view of the application under test on different platforms have identical or sufficiently similar layouts, thereby testing the cross-platform consistency of the application under test.

The first data and the second data can be compared to determine whether data (e.g., backstage data) generated, processed and/or stored by the application in response to an action are similar. Thus, it can be determined whether backstage responses of the application are consistent on different platforms. The result of comparing as performed in step S340 can be stored and utilized according to any appropriate manner. For example, the comparison result can be stored into log for future use.

According to embodiments of the present invention, the user does not repeat the same operation on a plurality of different platforms. On the contrary, it is only required to perform at least one specific action on the application on the first platform as the master platform. The server will automatically trigger the action on the second platform based on the action on the first platform. In this way, responses of the application to the same action on different platforms can be compared automatically and more accurately. In one embodiment, the action for an application on the master platform can even be implemented automatically by virtue of a tool such as a simulator. The cross-platform application testing can be automatically performed without any user interference.

In particular, steps S310 and S340 can be performed repetitively or continuously for different actions. In one embodiment, after the comparison for the current first and second views is completed, cross-platform comparison for view updates caused by a subsequent action can be performed. The cross-platform application testing can be performed continuously and dynamically. When the user or simulation tool performs an action on an application on the first platform to thereby cause update of the first view, the action and the associated data and/or event can be dynamically and even in real-time "copied" to the second platform. This allows an update of the second view on the second platform. Thus, it can be compared whether the updated layouts of the views are identical.

In one embodiment, an update of the view can include a layout update within the current view. For example, when pressing a particular button of the application on the first platform the application likely unfolds a menu. In this case, the first layout of the first view of the application on the first platform will be updated. At this point, the server can receive, from the first device, the screen shot and/or metadata of the updated first view layout and thereby determine the first updated layout of the first view.

Next, the server can trigger the same action on the second platform. In the above description, the server can trigger pressing on the specific button on the second platform, thereby causing update of the second layout of the second view on the second platform. In a manner similar to the above description, the server can determine the second updated layout of the second view of the application on the second platform. By comparing the first updated layout and the second updated layout, it can be determined whether the same action will cause the same view layout update on different platforms.

Alternatively, a view update can also include jumping between views. An action for an application can cause a jump of the view. In an example of user logon, when the user clicks onto the "logon" button after the user enters the username and password, the application will jump from the current view to a new view. In this case, the server can determine the first new layout of the first new view on the first platform.

Correspondingly, the server can trigger a corresponding action for the application under test on the second platform, such that the second new view is displayed on the second platform. For example, the server can copy the username and password entered on the first platform to a corresponding UI element on the second platform and trigger pressing of the "logon" button. As mentioned above, the server can determine a second new layout of the second new view on the second platform based on the screen shot and/or metadata of the new view on the second platform. By comparing the first new layout and the second new layout, it can be determined whether a view jump caused on the action is consistent on the first and second platforms.

By taking a layout update within a view or view update such as a view jump into account, the present invention can test the cross-platform consistency of the application UI and test the cross-platform consistency of the functions of the application flexibly and dynamically. According to embodiments of the present invention, the cross-platform consistency of an application for continuous testing can be performed for a set of actions as well as for a single action. For example, the set of actions can be semantically continuous actions. If the responses of the application to such set of actions are identical on the first platform and the second platform are consistent, it can be determined that the functions of the application on the two platforms are consistent.

In addition to continuous testing on view update, continuous testing on the backstage data generated by the application in response to a set of actions can also be performed. This will test whether the backstage response of the application are consistent on different platforms.

Figure 4:
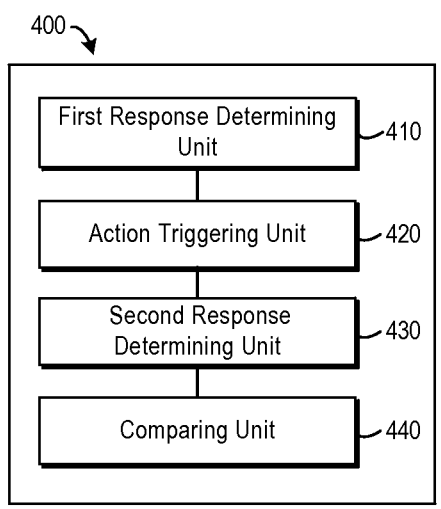
FIG. 4 shows a schematic block diagram of a computer-implemented system for testing an application across platforms according to embodiments of the present invention.

FIG. 4 shows a schematic block diagram of a computer-implemented system 400 for testing an application across platforms according to embodiments of the present invention. As shown in the figure, the system 400 includes a first response determining unit 410 configured to determine a first response of the application to an action on a first platform. An action triggering unit 420 is configured to automatically trigger the action for the application on a second platform by identifying the action, the second platform being different from the first platform. Then, a second response determining unit 430 is configured to determine a second response of the application to the action on the second platform. Lastly, a comparison unit 440 is configured to compare the first response and the second response to test consistency of the application on the first platform and the second platform.

In one embodiment, the first response determining unit can include a first layout determining unit configured to determine a first layout of a first view of the application displayed on the first platform in response to the action. The second response determining unit 430 can include a second layout determining unit configured to determine a second layout of a second view of the application displayed on a second platform in response to the action. The comparing unit 440 includes a layout comparing unit configured to compare the first layout and the second layout. In one embodiment, the first layout determining unit can include a screen shot receiving unit configured to receive a screen shot of the first view from the first platform and an element identifying unit configured to identify an attribute of an element in the first view based on the screen shot.

In one embodiment, the system 400 can include a metadata receiving unit configured to receive metadata associated with the first view from the first platform. Correspondingly, the element identifying unit can be configured to identify the attribute of the element based on the screen shot and the metadata.

In one embodiment, the first layout determining unit can include a first layout receiving unit configured to receive information descriptive of the first layout from the first platform, the information generated at the first platform.

In one embodiment, the system can further include an auxiliary information receiving unit configured to receive, from the first platform, at least one of foreground data and events associated with the action. Correspondingly, the action triggering unit 420 can be configured to trigger the action on the second platform based on the at least one of the data and events.

In one embodiment, the first response determining unit 410 can include a first data receiving unit configured to receive first data generated by the application on the first platform in response to the action. The second response determining unit 430 can include a second data receiving unit configured to receive second data generated by the application on the second platform in response to the action. The comparing unit 440 can include a data comparing unit configured to compare the first data and the second data.

It should be noted that for the sake of clarity, FIG. 4 does not show optional units or sub-units included in the system 400. All features and operations as described above are suitable for system 400, respectively, which are therefore not detailed here. Moreover, partitioning of units or subunits in system 400 is exemplary, rather than limitative, intended to describe its main functions or operations logically. A function of one unit can be implemented by a plurality of other units; on the contrary, a plurality of units can be implemented by one unit. The scope of the present invention is not limited in this aspect.

Moreover, the units included in the system 400 can be implemented by various manners, including software, hardware, firmware or a random combination thereof. For example, the apparatus can be implemented by software and/or firmware. The system 400 can be implemented partially or completely based on hardware. At least one unit in the system 400 can be implemented as an integrated circuit (IC) chip, an application-specific integrated circuit (ASIC), a system on chip (SOC), a field programmable gate array (FPGA), etc. The scope of the present intention is not limited to this aspect.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes at least one executable instruction for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of testing an application across platforms, the method comprising:
    determining a first response of the application to an action performed by a user on a first platform, wherein the first response includes a first layout of a first view of the application displayed on the first platform in response to the action, and wherein determining a first layout of the first view comprises:
        receiving a screen shot of the first view from the first platform;
        receiving metadata associated with the first view from the first platform; and
        identifying the attribute of the element based on the screen shot and the metadata;
    transmitting the first response to a server, wherein the server identifies the action based on the first response and, in response, automatically triggers the action on a second platform, the second platform being different from the first platform;
    determining a second response of the application to the action on the second platform, wherein the second response includes a second layout of a second view of the application displayed on the second platform in response to the action; and
    comparing the first response and the second response to test consistency of the application on the first platform and the second platform, wherein comparing the first response and the second response is based, at least in part, on comparing the first layout and the second layout.

2. The method according to claim 1, wherein the determining a first layout of a first view of the application displayed on the first platform in response to the action comprises:
    receiving information descriptive of the first layout from the first platform, the information generated at the first platform.

3. The method according to claim 1, wherein the transmitting the first response to a server, wherein the server identifies the action based on the first response and automatically triggers the action on a second platform comprises:
    obtaining, from the first platform, at least one of foreground data and event associated with the action; and
    triggering the action on the second platform with the at least one of the foreground data and the event.

4. The method according to claim 1,
    wherein the determining a first response of the application to an action on a first platform comprises receiving a first data generated by the application on the first platform in response to the action;
    wherein the determining a second response of the application to the action on the second platform comprises receiving a second data generated by the application on the second platform in response to the action; and
    wherein the comparing the first response and the second response comprises comparing the first data and the second data.

5. The method according to claim 1,
    wherein the first platform and the second platform are platforms for a mobile device.

6. A system for testing an application across platforms, comprising:
    a memory;
    a processor communicatively coupled to the memory; and
    a module for testing an application across platforms configured to carry out the steps of a method comprising:
        determining a first response of the application to an action performed by a user on a first platform, wherein the first response includes a first layout of a first view of the application displayed on the first platform in response to the action, and wherein determining a first layout of the first view comprises:
            receiving a screen shot of the first view from the first platform;
            receiving metadata associated with the first view from the first platform; and
            identifying the attribute of the element based on the screen shot and the metadata;
        transmitting the first response to a server, wherein the server identifies the action based on the first response and, in response, automatically triggers the action on a second platform, the second platform being different from the first platform;
        determining a second response of the application to the action on the second platforms, wherein the second response includes a second layout of a second view of the application displayed on the second platform in response to the action; and
        comparing the first response and the second response to test consistency of the application on the first platform and the second platform, wherein comparing the first response and the second response is based, at least in part, on comparing the first layout and the second layout.

7. The system according to claim 6, wherein the step of determining a first layout further comprises:
   receiving information descriptive of the first layout from the first platform, wherein the information is generated at the first platform.

8. The system according to claim 6, the method further comprising:
   obtaining, from the first platform, at least one of foreground data and event associated with the action.

9. The system according to claim 8, wherein the method further comprises the step of:
   triggering the action on the second platform with at least one of the foreground data and the event.

10. The system according to claim 6, wherein the step of determining a first layout further comprises:
    receiving a first data generated by the application on the first platform in response to the action.

11. The system according to claim 6, wherein the step of determining a second response further comprises:
    receiving a second data generated by the application on the second platform in response to the action.

12. The system according to claim 6, wherein the step of comparing the first response and the second response further comprises:
    comparing the first data and the second data.

13. The system according to claim 6, wherein the first platform and the second platform are platforms for a mobile device.

* * * * *